B. A. BRYON.
DEMOUNTABLE RIM.
APPLICATION FILED APR. 23, 1915.

1,194,136.

Patented Aug. 8, 1916.
2 SHEETS—SHEET 1.

Witnesses
J. F. Byrn

Inventor
B. A. Bryon.
By
Attorney

UNITED STATES PATENT OFFICE.

BENN A. BRYON, OF RIDGEFIELD, CONNECTICUT.

DEMOUNTABLE RIM.

1,194,136.　　　　　Specification of Letters Patent.　　Patented Aug. 8, 1916.

Application filed April 23, 1915. Serial No. 23,398.

*To all whom it may concern:*

Be it known that I, BENN A. BRYON, a citizen of the United States, residing at Ridgefield, in the county of Fairfield and State of Connecticut, have invented certain new and useful Improvements in Demountable Rims; and I do hereby declare the following to be a full, clear, and exact description of the invention, such as will enable others skilled in the art to which it appertains to make and use the same.

This invention relates to new and useful improvements in demountable rims for vehicles, and has for its principal object to provide a device which will enable the user to easily and quickly remove a tire from the wheel of a motor vehicle and substitute a new tire in place thereof.

Another object of the invention is to provide a demountable rim which may be easily and quickly slipped in place on the vehicle and which when in position may be locked thereon to avoid danger of displacement.

A further object of the invention is to provide a demountable rim formed of two separate interlocking rim sections which are capable of being firmly locked together without being attached to the rim of the wheel.

Still another and more specific object of the invention is to provide a novel means for locking the demountable rim in place on the wheel rim in such a way as to prevent the demountable rim from being accidentally detached and also to prevent the same from creeping on the wheel rim.

Figure 1:
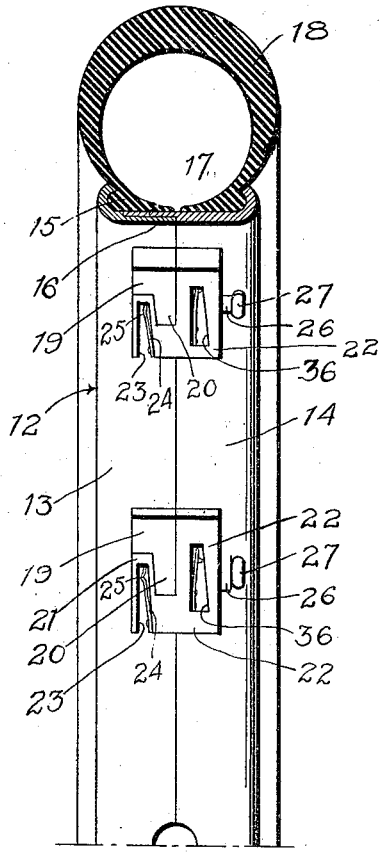
Figure 2:
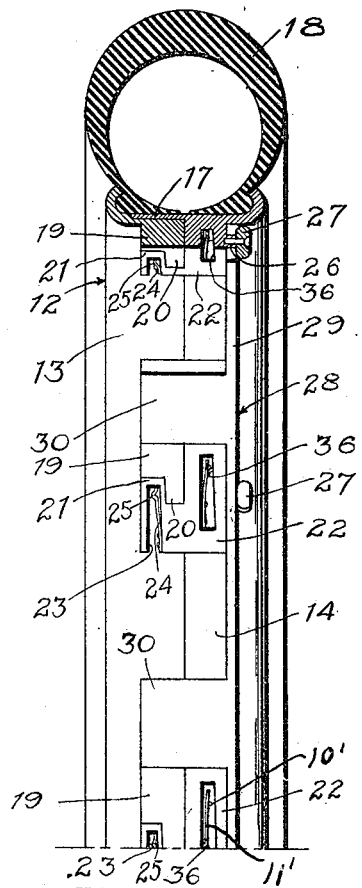
Figure 9:
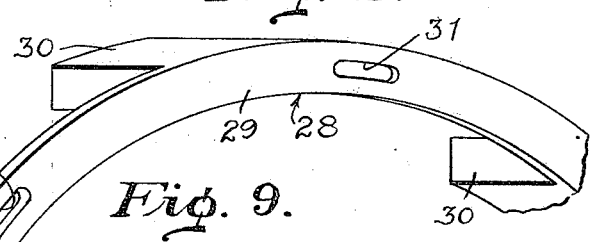
Figure 3:
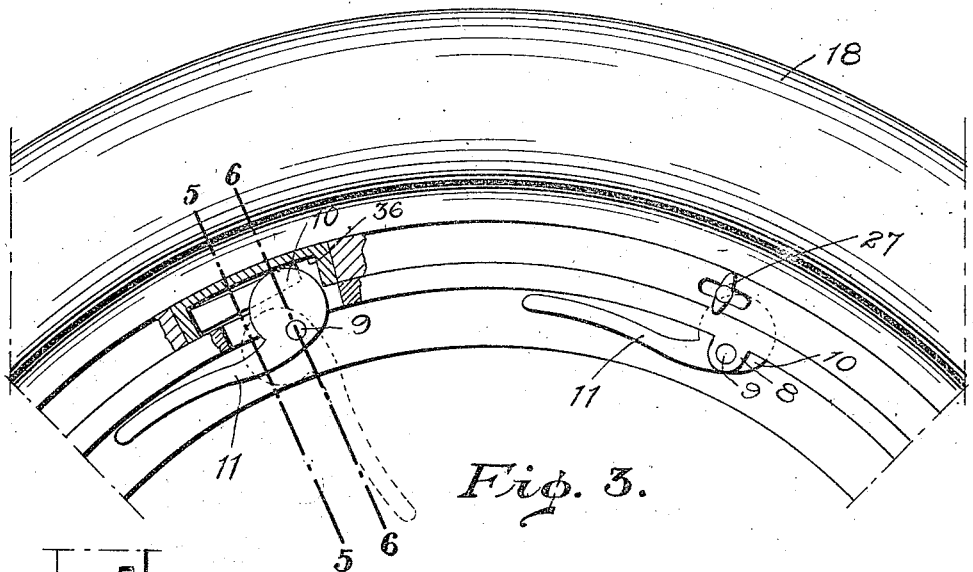
Figure 4:
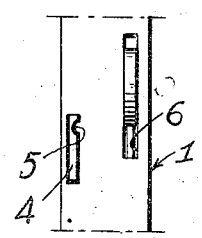
Figure 5:
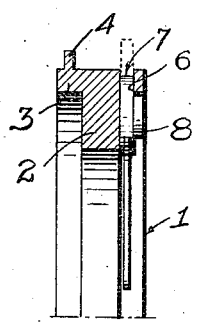
Figures 6, 7:
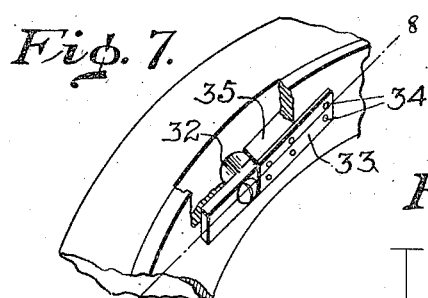
Figure 8:
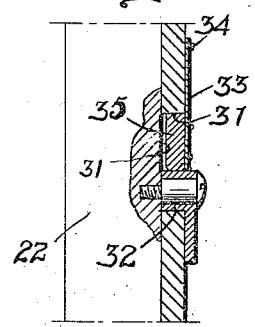

With these and other objects in view, the invention consists in the novel combination and arrangement of parts which will be fully set forth in the following specification and accompanying drawings, in which, Figure 1 is a vertical sectional view of a portion of a wheel rim showing the pneumatic tire in place, Fig. 2 is a view similar to Fig. 1 taken through one of the interlocked members showing the detailed construction of the same, Fig. 3 is a side view of a portion of a wheel showing the method of locking the tire holding rim in place, Fig. 4 is a fragmentary view in elevation of the wheel rim, Fig. 5 is a sectional view of the wheel rim taken on the plane of line 5—5 of Fig. 3, Fig. 6 is a sectional view taken on line 6—6 of Fig. 3, Fig. 7 is a detail perspective view of a modified form of ring holding element, Fig. 8 is a sectional view taken on the plane of line 8—8 of Fig. 7, and Fig. 9 is a fragmentary perspective view of the locking rings.

Referring now to the drawings in detail, the numeral 1 designates as an entirety the wheel rim which comprises the body 2 having the flange 3 formed on the periphery thereof. This body 2 is circular in form and the flange 3 extends beyond the lateral edges thereof as clearly shown in Fig. 5. Formed at spaced intervals around the periphery of the body and extending upwardly therefrom are the lugs 4 having formed near one end the recesses 5, the use of which will appear as the description proceeds. Formed in the flange 3 on the opposite side from the lugs 4 are the slots 6 in which the eccentrics designated generally by the numeral 7, are mounted. Suitable depending ears 8 are formed beneath the slots on the flange, and through these ears and into the body 2 extend the pivot pins 9 on which the eccentrics 7 are mounted. These eccentrics comprise the eccentric disks 10 having formed thereon the handles 11 and they are so constructed as to swing into the positions illustrated in Fig. 3 both by the full and dotted lines. These eccentrics are preferably tapered and formed with suitable recesses not shown, which recesses are for the reception of the lugs 10′ carried by the springs 11′ which are secured within the parts 36, which will be more fully hereinafter described. It will thus be seen that when the eccentrics are in their closed position the lugs 10′ will seat in the recesses and prevent the eccentrics from becoming accidentally unlocked.

Coöperating with the wheel rim 1 is the tire rim or demountable rim designated generally by the numeral 12, which comprises two separate rim elements 13 and 14. The rim element 13 is formed with the annular recess 15 which forms the tongue 16 which coöperates with the tongue 17 formed on the rim section or element 14 in forming a smooth annular trough for the reception of the tire shoe 18. Formed at spaced intervals on the inner face of the rim section 13 are the lugs 19 which are formed with the tongues 20, which tongues coöperate with the tongues 21 formed on the lugs 22 which are carried by the rim section 14. The lugs 21 form hooks, the bight portions of which receive the lugs 20, and it will be apparent that the two rim sections are firmly held together when the lugs 20 and 21 are in position. A suitable recess 23 is formed in each of the lugs 21 and extends throughout its entire length and forms a chamber in which the spring 24 is mounted. This spring 24 is provided with the offset portion 25 near its free end, which offset portion rests in the notch 5 in the lug 4 of the wheel rim 1 when the tire shoe 18 and demountable rim 12 are in place. Extending outwardly from each of the lugs 22 is a cylindrical stem 26, on the end of which is rotatably mounted the turn button 27, the use of which will appear as the description proceeds.

In order to hold the rim sections in their interlocked position, the locking ring, designated generally by the numeral 28, is provided, and this ring comprises the circular body 29 which is formed with the arms 30, which arms extend angularly therefrom at spaced intervals and engage the outer faces of the lugs 19 to hold the same against accidental displacement. This ring is formed at spaced intervals with slots 31 which are for the reception of the turn buttons hereinbefore mentioned. These slots engage the extensions 26 and thereby prevent the ring from slipping and coming from its position on the rim 12.

In Fig. 8 there is shown a modified form of ring holding means in which the lug 22, instead of being formed with the oval extension 26, is provided with an internal screw-threaded bore for the reception of the pivot screw on which the hook 32 is mounted. The end of said hook is arranged to overlie the outer face of the ring to hold the same in place. A suitable spring 33 is riveted or otherwise secured, as at 34, to the ring, and this spring carries the filler block 35, which fills the space between the end of the slot 31 and the rear portion of the hook, as clearly illustrated in Figs. 7 and 8.

It will be apparent from the foregoing that in use the shoe 18 is first placed between the rim sections 13 and 14 and the two are then locked together as shown in the drawings. The ring 28 is then slipped in place, as illustrated in Fig. 2, and the turn buttons turned so as to extend across the slots 31. It will be apparent that in this position the ring cannot come loose without first turning the turn buttons to permit the same to pass through the slots 31. It will also be evident that in this position the lug 21 cannot become disengaged with the lug 20 and the whole will be firmly locked in place and in readiness to be slipped on the wheel rim. The demountable rim is then slipped in place on the wheel rim and given a slight turn so that the spring 25 will engage in the notch 5 in the lug 4. The eccentrics 7 are then turned into the position shown by the full lines in Fig. 3 so that the disks 10 engage in the grooves 36 formed in the lugs 22 and in this position it will be apparent that accidental movement of the tire rim 12 with relation to the wheel rim 1 will be eliminated.

While in the foregoing there has been shown and described the preferred embodiment of this invention, it is to be understood that such changes may be made in the combination and arrangement of parts as will fall within the spirit and scope of the invention as claimed.

What is claimed is:

1. A demountable rim comprising a pair of rim sections, lugs carried on the inner faces of the rim sections and arranged to interlock, studs carried by one of the rim sections, turn buttons on the ends of the studs, a ring having apertures therein arranged to fit the studded rim section, the apertures in the ring receiving the studs, arms on the ring engaging the lugs on the rim sections, and means to removably hold the demountable rim on a wheel rim.

2. A demountable rim comprising a pair of rim sections, inwardly extending lugs on the inner faces of the rim sections, interlocking tongues on the lugs adapted to hold the rim sections in their assembled positions, studs carried by one of the rim sections, turn buttons on the ends of the studs, a ring provided with slots therein to receive the studs on the rim sections, arms on the rings engaging the lugs to prevent the rim sections from becoming separated and means to hold the rim on a wheel.

3. A demountable rim comprising a pair of rim sections, interlocking means carried by said sections, and adapted to hold the rim sections in locked positions when rotated in one direction and to unlock the sections when rotated in the opposite direction, lugs carried by one of the rim sections, rotatable tongues on the lugs, a ring provided with slots at spaced intervals therein, said slots being adapted to receive the lugs and being of sufficient length to slip over the tongues and means carried by the rings to fill the space between one of the end walls and the lug to prevent the ring from being accidentally removed from the rim sections and means carried by said ring to prevent relative rotation of the rim sections and hold the same in their assembled positions.

In testimony whereof I affix my signature.

BENN A. BRYON.